Patented Apr. 18, 1950

2,504,182

UNITED STATES PATENT OFFICE 2,504,182

AMINE SALTS OF PENICILLIN

Douglas E. Cooper, Syracuse, N. Y., assignor to Bristol Laboratories, Inc., Syracuse, N. Y., a corporation of New York No Drawing. Application November 15, 1946, Serial No. 710,221

3 Claims. (Cl. 260—302)

This invention relates to penicillin and salts of penicillin, and more particularly to certain amine salts of penicillin.

An object of this invention is to produce antibiotic substances efficiently and economically.

Another object of this invention is to isolate stable salts of penicillin which possess extremely high antibiotic characteristics.

Another object of this invention is to provide penicillin salts having a high degree of purity.

In the production and utilization of penicillin and salts thereof for use as antibiotic products, various methods have heretofore been proposed for concentrating and purifying such products. The concentration of penicillin in the broth after fermentation expressed as Oxford units has usually been found to be within the range of from 150 to 800 units per ml. To utilize a penicillin product for therapeutic purposes, it is desirable that the concentration be in the neighborhood of 5,000 to 300,000 units per ml. The penicillin or salt thereof contained in the fermentation broth is ordinarily isolated and concentrated by repeated conversion to penicillin, extraction with a suitable solvent, such as amyl acetate, and reconversion to a salt of penicillin such as sodium penicillin. While concentrations of 30,000 to 50,000 Oxford units per ml. may be obtained by the practice of this method, the compositions so produced are substantially contaminated with impurities such as plant pigments. The purpose of conversion to the acid form and reconversion to a salt, such as sodium penicillin, is to concentrate and purify the product. Since the utilization of the formation of certain salts of penicillin, such as the sodium salt thereof, results in impure products, various other derivatives have been proposed for securing greater purity of the resulting product. For example, a crystalline benzylamine derivative has been reported [Science, 102, 628 (1945)] but this derivative has been found, due apparently to a major modification of the penicillin structure, to have substantially no antibiotic activity. Moreover, this benzylamine derivative has not by any known methods been regenerated to a substance possessing the antibiotic activity of the penicillin from which it was derived.

In accordance with this invention, salts of penicillin are utilized in the isolation and purification of penicillin and salts thereof whereby a substantially purer product having higher antibiotic action is obtained than by the methods heretofore employed. The compositions of this invention are salts of penicillin and an amine having the following formula:

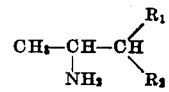

in which $R_1$ is an aryl group and $R_2$ is a member selected from the class consisting of hydrogen and the hydroxyl radical. These salts may be prepared by reacting penicillin with an amine as heretofore defined. Desirably, the amine salt of penicillin is produced by reacting the amine with penicillin in a solvent in which the penicillin and the amine are soluble and the resulting reaction product is substantially insoluble. As a result of this procedure, the amine salt of penicillin separates in the solvent from which it may readily be removed. The practice of this preferred procedure results in a substantially pure product relatively free from pigments when compared with the purity of metallic salts of penicillin, for example, prepared by methods heretofore practiced.

There are many solvents in which the amine salts of penicillin are substantially insoluble but in which penicillin and the amine are soluble, such as ether, amyl acetate, ethylene dichloride, 2-nitro propane and isopropyl acetate. Accordingly, if it is desired to purify penicillin, it may be dissolved in one of these latter solvents, such as ether, and the amine added to react with the penicillin to produce the amine salts of penicillin. The amine salt of penicillin separates out of the solution whereby it may be easily removed from the reaction mixture and subsequently reconverted to penicillin. If desired, the penicillin may then be converted to a metal salt of penicillin, such as sodium penicillin.

By penicillin is meant one or more of the several antibiotics of empirical formula

produced by the growth of *Penicillium notatum*, *Penicillium chrysogenum*, or these same substances whenever produced by other means. Chemical characteristics of penicillin and possible structures are disclosed in an article presented by the Committee on Medical Research, O. S. R. D., Washington, and The Medical Research Council, London, in Science 102, 627-9 (1945). Penicillin is indicated as being a complex monocarboxylic acid. The products formed by the reaction between the amine as heretofore defined and penicillin are the amine salts of this carboxylic acid group.

A more comprehensive understanding of this invention is obtained by reference to the following examples:

*Example 1.—Preparation of the penicillin salt of 1-phenyl-2-aminopropane*

A solution of 1-phenyl-2-aminopropane in ether, substantially free from moisture, was added at below 10° C. with stirring to a dry ether solution of penicillin until about 1.1 mols. of 1-phenyl-2-aminopropane per mol of penicillin were added. A solid separated, which was the penicillin salt of 1-phenyl-2-aminopropane.

The resulting penicillin salt of 1-phenyl-2-aminopropane may be separated from the reaction mixture by maintaining the mixture at about 5° C. for about three hours and then filtering. The penicillin salt of 1-phenyl-2-aminopropane may be washed with ether and dried in air or a desiccator.

*Example 2.—Preparation of the penicillin salt of 1-phenyl-1-hydroxy-2-aminopropane*

A dry solution of 1-phenyl-1-hydroxy-2-aminopropane in ethyl ether, maintained at about 10° C. was added to a dry ether solution of penicillin also maintained at about 10° C. until about 1.1 mols of 1-phenyl-1-hydroxy-2-aminopropane per mol of penicillin was added. An oil, which subsequently changed to a solid and which was the penicillin salt of 1-phenyl-1-hydroxy-2-aminopropane, was precipitated. This penicillin salt of 1-phenyl-1-hydroxy-2-aminopropane may be recovered from the reaction mixture in the same manner as the salt of 1-phenyl-2-aminopropane was obtained as described in Example 1.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A salt of penicillin and an amine having the following formula:

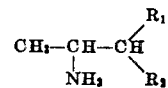

in which $R_1$ is a phenyl group and $R_2$ is a member selected from the class consisting of hydrogen and the hydroxyl radical.

2. A salt of penicillin and 1-phenyl-2-aminopropane.

3. A salt of penicillin and 1-phenyl-1-hydroxy-2-aminopropane.

DOUGLAS E. COOPER.

REFERENCES CITED

The following references are of record in the file of this patent:

British Abraham Journal of Experimental Pathology, vol. 23, June 1942, pages 108, 109, 112.

Heyden Reports H-II, May 22, 1944, pp. 1 and 2.

Heyden Reports H-IV, June 15, 1944, pp. 1 and 2.

Merck Report M-77, Sept. 28, 1945, pp. 1, 2 and 3.

Proceeding of the Society of Experimental Biology and Medicine, Jan. 1945, pp. 74-76.

Physician Bulletin Nov.-Dec. 1945, "Question and Comments," p. 183.

British Report, Br 234 CPS 687 Feb. 12, 1946 pp. 1, 2 and 3.

American J. of Pharmacy, Oct. 1946, p. 365.